June 26, 1923.
C. WESTERGARD
VEHICLE SPRING
Filed April 25, 1921
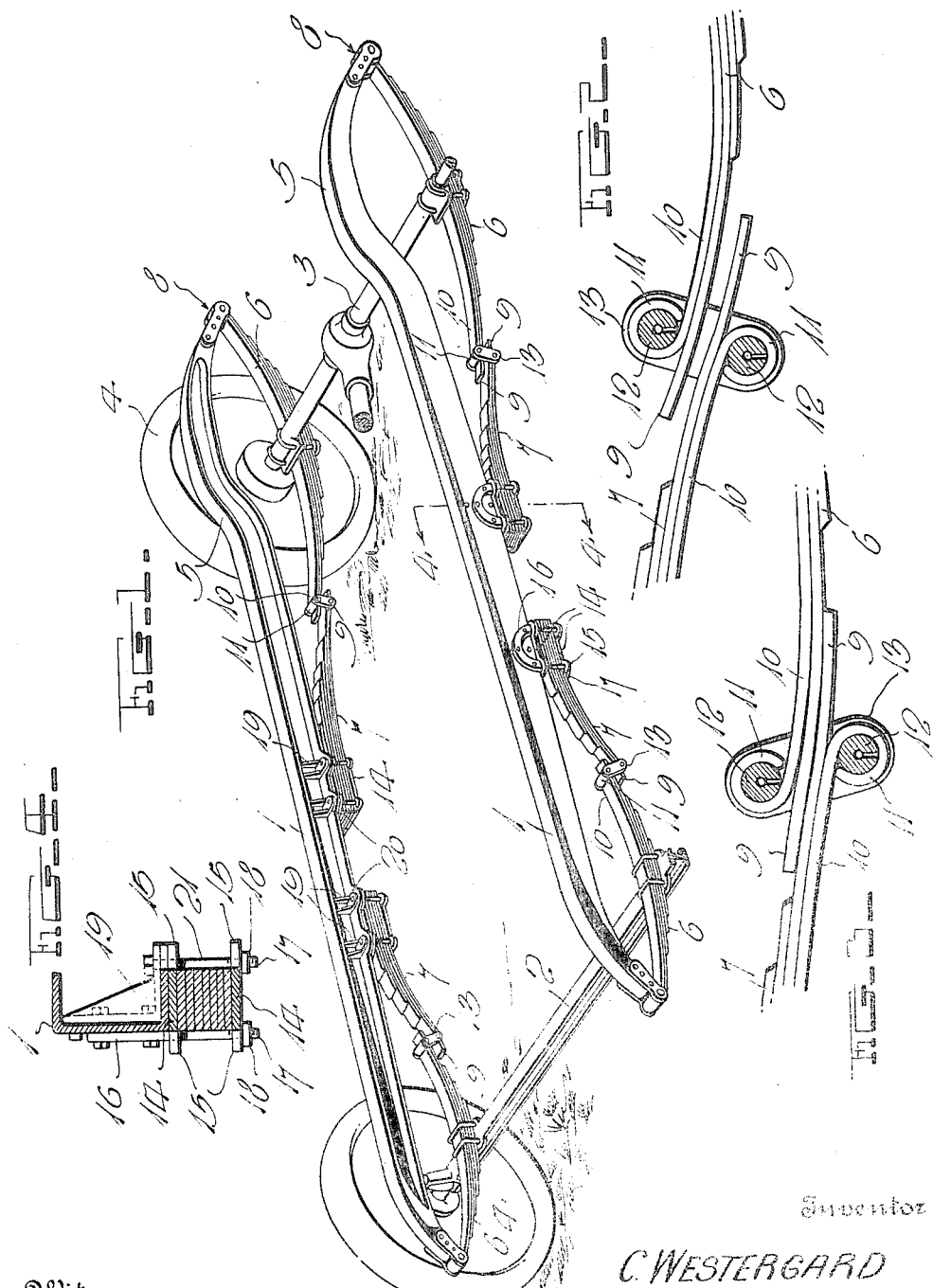
Inventor
C. WESTERGARD Patented June 26, 1923.

1,460,298

UNITED STATES PATENT OFFICE.

CHRIST WESTERGARD, OF DENBIGH, NORTH DAKOTA.

VEHICLE SPRING.

Application filed April 25, 1921. Serial No. 464,105.

*To all whom it may concern:*

Be it known that I, CHRIST WESTERGARD, a citizen of the United States, residing at Denbigh, in the county of McHenry and State of North Dakota, have invented certain new and useful Improvements in Vehicle Springs; and I do declare the following to be a full, clear, and exact description of the invention, such as will enable others skilled in the art to which it appertains to make and use the same.

This invention relates to improvements in vehicle springs, and it has for its principal object to improve upon my Patent, No. 1,354,082 granted to me on September 28, 1920.

A brief review of the above referred to patent will disclose the fact that it embodies a plurality of semi-elliptic springs rigidly connected at their outer ends to the corresponding ends of the side bars of the chassis, together with a plurality of quarter-elliptic springs connected to and carried by the intermediate portion of the side bars, these last named springs being pivotally connected by shackles or the like to the adjacent ends of the semi-elliptic springs, and with the first named springs, yieldably supporting the body of the vehicle throughout its entire length. My patent also embodies other details which need not be referred to here.

The improved features of construction embodied in the present spring arrangement reside in the fact that I employ novel means for connecting the ends of the semi-elliptic springs and quarter-elliptic springs together. In the new device, the ends of these springs are arranged in spaced overlapping relation and are pivotally connected together by shackles and when the main or semi-elliptic springs are straightened as they are, when an obstruction in the path of travel is encountered, the overlapping ends of the springs are brought into contact with one another and a relatively long spring is provided and this constitutes an effective yieldable support for the body, and causes the wheels to stick to the surface over which they are travelling and insures increased life for the tires. This result is not obtained by the ordinary relatively short springs now employed.

In addition to the foregoing advantage, other features and advantages are derived from this new construction and arrangement. For instance, since the main semi-elliptic springs have direct pivotal connection with the corresponding ends of the side chassis bars, a direct "pull" is exerted on the latter instead of a "push" as is brought about with the ordinary spring suspension. Hence, the various leaves of the springs are prevented from buckling and twisting with respect to each other and breakage thereof is thus overcome. Furthermore, since the ends of the semi-elliptic springs and quarter-elliptic springs are arranged in overlapping relationship, the shackles arranged at these points are relieved of lateral strains and twists and the chances of breakage of these elements is reduced to a minimum. Not only this, the novel construction and arrangement of parts shown, permits the various sets of springs to assume the duty of torque rods and in conjunction with the latter, the efficiency of these rods is doubled. These and other features and advantages of the invention will appear as the description goes on.

In the accompanying drawings forming a part of this specification and in which like numerals are employed to designate like parts throughout the same:

Figure 1 is a perspective view of an automobile chassis equipped with my improved springs showing the manner in which they are connected with one another and associated with the chassis.

Figure 2 is an enlarged detail view with one half of the shackle removed to show the particular way in which the ends of the semi-elliptic and quarter-elliptic springs overlap one another, the parts being shown in their normal positions.

Figure 3 is a view like Fig. 2 showing the positions the springs and shackle assume when under tension.

Figure 4 is an enlarged detail sectional view taken on the plane of the line 4—4 of Fig. 1, showing the novel anchoring means for the quarter-elliptic spring.

Referring to the drawings, the numeral 1 designates the spaced longitudinal side bars of an automobile chassis, the numeral 2 designates the front axle, the numeral 3 designates the rear axle, and 4 designates the wheels. At this point, I wish to state that the side bars 1 by preference are channel-shaped and have their open faces directed toward each other in the manner shown. I further wish to direct attention to the fact that the bars intermediate their centers and rear ends are offset upwardly as indicated at 5 to especially adapt them for use in connection with my improved spring arrangement, enabling them to withstand great pull and strain which is brought about by the aforesaid arrangement of springs.

In the drawings, I have shown four sets of springs and as each set is a duplicate of the other, only one set need be described. To this end, each set of springs comprises a pair of leaf springs, one of them, designated by the numeral 6, being of the semi-elliptic type while the remaining one 7, is of the quarter-elliptic type. As shown in my prior patent and as customary, the semi-elliptic spring is secured intermediate its ends to one of the axles. Since my spring arrangement has a greater effect on the rear end of the chassis in bringing about the aforesaid "pulling" effect, I desire to restrict the description for the time being to the rear end of the chassis. To this end, I wish to state that the outer end of one of the rear semi-elliptic springs 6 is directly pivotally connected to the corresponding end of the adjacent side bar 1 as indicated at 8. Spring 7 on the other hand, is rigidly connected by suitable means to the intermediate portion of the same side bar. This construction and arrangement leaves the opposite or adjacent ends of the two springs practically free. However, as before intimated, these ends of the two springs overlap one another in spaced relation, so that, when the springs are idle and the machine not running these ends remain in spaced relation. By referring to Figs. 2 and 3, it will be seen that one of the intermediate leaves 9 of each of the springs provide the above referred to overlapping connection. One of the outer leaves 10 of each of these springs has its end rolled or bent upon itself to form a bearing 11 in which one of the cross-pins 12 of the shackles 13 are rotatable. At this point, I wish to state that while I have shown particular leaves of the springs arranged in overlapping relationship, I wish it to be understood that any one or all of them may be so arranged. In other words, one or more of the leaves of each spring may be extended beyond the bearings 11 for slidable engagement with the leaves of the other spring.

Emphasis is to be laid on the fact that this construction and arrangement is extremely advantageous since when the rear semi-elliptic springs 6 are straightened and placed under strain, the overlapping leaves of the two springs are brought into frictional contact with one another and the shackle is moved to the angular position disclosed in Fig. 3. When the parts are in this position, a relatively long spring is formed, that is, the two springs together practically form one long spring. Since all of the sets of springs act alike, the vehicle is practically yieldably supported throughout its entire length and since four relatively long springs are formed, an extremely effective cushioning and absorption of the shocks and jars will result. This particular operation and positioning of springs on similar patented devices is not accomplished. Furthermore, I may also again call attention to the fact that since the rear springs 6 are directly pivotally connected with the side bars 1 at the rear ends of the latter, a direct pull is exerted on these ends of the bars, this result being brought about by the connection of the rear axle 3 with the intermediate portion of the spring which places the power in front of the points of connection of the springs 6 and side bar 1. With the ordinary construction and arrangement, this direct pull is not accomplished. Hence, the tendency of the leaves of the springs to buckle and break caused by separation, is to a great extent, overcome. It is hardly necessary to again remind the reader that the particular construction and arrangement shown causes each set of springs to assume the duty of a torque rod and also to function to relieve the connecting shackles 13 of excessive strain and twists.

While I do not desire to limit myself to any particular means for connecting the quarter-elliptic springs 7 with the side bars 1, I prefer to use the means shown. To this end, I make use of spaced clamping plates 14 which are arranged between the lower sides of the bars 1 and top leaf of the springs and one against the lower leaf of the springs. These plates include apertured ears 15 which extend beyond the side bars 1. A hanger bracket 16 is bolted or otherwise secured to the side bar and includes screw-threaded arms 17 which pass downwardly through the eyes 15 on the outer sides of the side bar, nuts 18 being threaded on the ends of these arms to clamp the leaves of the springs between the plates 14. The means also includes reinforcing brackets 19, these being arranged between the horizontal flanges of the side bars and being rigidly secured to the closed vertical sides of the latter. The lower horizontal flange of the side bar is formed with ears 20 which rest on the adjacent ears of the upper clamping plate 14, a bolt 21 being passed through the apertured end of the bracket 19 downwardly through the ears 20 and 15 to secure these ends of the plate together.

It is thought that a careful consideration of the foregoing description taken in connection with the acompanying drawings is sufficient to enable persons skilled in the art to which the invention relates to obtain a clear understanding of the same and it is therefore thought unnecessary to describe in detail, the operation of the springs and effect thereof on the chassis and body of the vehicle.

Advantageous and effective results are practically assured with the construction and arrangement herein shown and described and this construction and arrangement is therefore taken as the preferred embodiment of the invention. However, I wish it to be understood that various minor changes in the shape, size, and arrangement of parts may be resorted to without departing from the spirit of the invention or the scope of the subjoined claims.

I claim:

1. A spring suspension comprising a spring curving upwardly from a vehicle axle, a second spring curving downwardly from the vehicle frame toward and in substantial alinement with the first named spring, and connecting means between the adjacent ends of said springs for holding them normally in vertically spaced overlapped relation but for guiding them into contact with each other and limiting inward sliding of one along the other when under strain, each spring having a leaf extending beyond said connecting means for contact with a part of the other spring when the suspension is under strain.

2. A spring suspension comprising a spring curving upwardly from a vehicle axle, a second spring curving downwardly from the vehicle frame toward and in substantial alinement with the first named spring, and a spring shackle pivoted to both springs for holding them normally in vertically spaced overlapped relation but for guiding them into contact with each other and limiting inward sliding of one spring along the other when under strain, each spring having a leaf extending beyond the shackle for contact with each other when the spring is under strain.

3. The combination with an automobile chassis including spaced side bars, wheels, and front and rear axles; of spring means arranged between the front axle and side bars, semi-elliptic main springs secured intermediate their ends to the underside of the rear axle, having direct pivotal connection at their rear ends with the corresponding ends of said bars, quarter-elliptic supplemental springs carried by the intermediate portions of the side bars, the inner ends of the said rear main springs overlapping the ends of the supplemental springs in spaced relation, and a shackle pivotally connecting the said overlapping ends of the springs, whereby when an obstruction is encountered, the overlapping portions of the springs will slidably contact one another and the pairs of coacting springs will act as one and exert a direct pull on the side bars, as described.

4. A spring suspension for vehicles comprising a pair of leaf springs adapted to be disposed in substantial horizontal alinement with their inner ends close together, each spring having at least one leaf extended beyond the others, said extended portions being adapted to normally overlap in vertically spaced relation, but slidably contacting one another when the springs are under strain, and a shackle pivotally connected with the spring adjacent said extended portions, said shackle serving to guide the latter into contact with each other and limiting the sliding movement thereof.

5. A spring suspension of the class described including a leaf spring having one leaf at one end extending beyond the other leaves to provide a shoe for slidably contacting the corresponding part of another spring, the extremity of one of the other leaves of said first named spring being bent upon itself inward of the free end of said shoe to provide a bearing for a shackle pin.

In testimony whereof I have hereunto set my hand.

CHRIST WESTERGARD.

Witnesses:
B. A. NESTOS,
MYRA M. HURD.